United States Patent
McAllister et al.

(10) Patent No.: US 10,691,359 B1
(45) Date of Patent: Jun. 23, 2020

(54) MESSAGING DELIVERY SYSTEM WITH LAST MESSAGE QUEUE

(75) Inventors: Shawn McAllister, Manotick (CA); Paul Kondrat, Ottawa (CA)

(73) Assignee: Solace Systems, Inc. (CA)

( * ) Notice: Subject to any disclaimer, the term of this patent is extended or adjusted under 35 U.S.C. 154(b) by 844 days.

(21) Appl. No.: 13/493,312

(22) Filed: Jun. 11, 2012

(51) Int. Cl.
*G06F 3/06* (2006.01)

(52) U.S. Cl.
CPC ................... *G06F 3/0635* (2013.01)

(58) Field of Classification Search
CPC .... H04L 47/00; H04L 49/90; H04L 29/08072
See application file for complete search history.

(56) References Cited

U.S. PATENT DOCUMENTS

| | | | |
|---|---|---|---|
| 7,716,525 B1 * | 5/2010 | Buchko | H04L 12/10 714/22 |
| 2005/0152286 A1 * | 7/2005 | Betts | H04L 45/02 370/255 |
| 2006/0059165 A1 * | 3/2006 | Bosloy | H04L 49/355 |
| 2007/0140250 A1 * | 6/2007 | McAllister | H04L 12/4645 370/392 |
| 2007/0220591 A1 * | 9/2007 | Damodaran | H04L 9/0643 726/4 |
| 2011/0320538 A1 * | 12/2011 | Ickman | G06F 9/542 709/206 |

* cited by examiner

*Primary Examiner* — Vivek Srivastava
*Assistant Examiner* — Hien V Doan
(74) *Attorney, Agent, or Firm* — Laubscher & Laubscher, P.C.

(57) ABSTRACT

In a message delivery system, wherein messages are published by publishers and delivered to subscribers based on subscriptions relating to message content. A last message queue is associated with each publisher, and a last message from each publisher is stored in the message queue associated with that publisher based on an attribute of the publisher. In this way, it is not necessary to modify the content data within the message to create the last message queue.

6 Claims, 3 Drawing Sheets

MESSAGING DELIVERY SYSTEM WITH LAST MESSAGE QUEUE

FIELD OF THE INVENTION

This invention relates to data communication networks and in particular methods of associating last message queues to publishing applications in a message delivery system.

BACKGROUND OF THE INVENTION

In the prior art, many message delivery systems exist which route messages between endpoints, such as between different applications. The messages may be routed to destination endpoints based on topics, queues, characteristics of the message content or a combination of criteria such as a topic to queue mapping. In the case of a system that routes messages based on topics an example of which is described in U.S. Pat. No. 7,716,525, the contents of which are herein incorporated by reference, there are publishing (or producing) clients that generate messages and subscribing (or consuming) clients that receive messages. When a publishing client creates a message it adds to it a topic. Destination endpoints are created by subscribing clients that have associated with them a series of subscriptions (or interests) that are used to attract messages to the subscribing application. Alternately subscriptions may be used to attract messages to a queue endpoint which one or more applications can connect to and receive messages. The topics are typically text strings that often contain sub-fields also known as hierarchical levels but, maybe also be numbers. Interests or subscriptions are of a similar form to the topics but, may contain regular expressions (also known as wild cards) or if the topics are in the form of numbers, the interests could be in the form of a range of numbers. If the messages are to be routed based on the message content then the subscriptions are in the form of regular expressions designed to match a portion of the content or an expression in a query language such as SQL or XPATH (if the message content is in XML format). The interests are gathered by the message delivery system and are used to determine which destination endpoint(s) should receive a copy of a particular message received from a publishing application in a process called matching. In the topic based message delivery system the process of matching involves comparing the topics of messages received from publishing clients to the interests gathered from subscribing applications or queues. A match to an interest is generated when the topic of the incoming messages falls within the regular expression(s) contained in the interest. The present invention is also applicable to systems that route messages based on the content of the message as described in U.S. Pat. Nos. 7,627,570 and 7,801,857 the contents of which are herein included by reference.

Applications that make use of message delivery systems are often mission critical and must have some resiliency built in, either a redundant system or the ability to restart from the previous state. A construct that is useful in implementing resilient applications is the last message queue as it is known in the art. The last message queue is simply a queue with an associated topic interest that is configured to hold only the most recent message sent to the topic. This construct works well for subscribing applications that need to know the most recent state of a particular message flow especially in cases where updates to the message flow are infrequent. Upon restarting a subscribing client can simply connect to the last message queue to recover the most recent state rather than waiting for the next message. The last message queue is less useful for publishing applications because multiple publishing clients can publish messages to the same topic endpoints. In order to uniquely identify the messages sent by a particular publishing client, a unique identifier for that client must be included in the topic hierarchy. This causes a number of unwanted side effects; the size of the topic space grows geometrically by the number of publishing clients and it is difficult to retrofit because it changes the structure of the topic (affecting all clients of the message delivery system). It is a useful feature of a message delivery system to have a last message queue that can be associated with a particular publisher without affecting the topic hierarchy.

SUMMARY OF THE INVENTION

According to the present invention there is provided method of routing messages in a network, wherein messages are published by publishers and are delivered to subscribers based on subscriptions relating to message content or topic fields contained within the message, comprising provisioning a last message queue for a publisher at an ingress router; storing an attribute identifying the provisioned last message queue for that publisher at the ingress router; looking up the attribute of the publisher of an incoming message to identify the last message queue for that publisher; and storing the message from the publisher in the last message queue associated with that publisher.

The message may be identified by content or by topics carried in a hierarchical structure within the messages. The invention avoids the need to modify the topic structure or content when the last message queue is configured.

Another aspect of the invention provides an ingress router for a message delivery system, wherein messages published by publishers are delivered to subscribers based on subscriptions relating to message content, comprising a last message queue associated with each publisher; a look-up table storing an attribute identifying the provisioned last message queue for that publisher at the ingress router; and a processor configured to look up the attribute of the publisher of an incoming message to identify the last message queue for that publisher; and to store the message from the publisher in the last message queue associated with that publisher.

BRIEF DESCRIPTION OF THE DRAWINGS

The invention will now be described in more detail, by way of example, with reference to the accompanying drawings, in which.

DETAILED DESCRIPTION OF THE PREFERRED EMBODIMENTS

Figure 1:
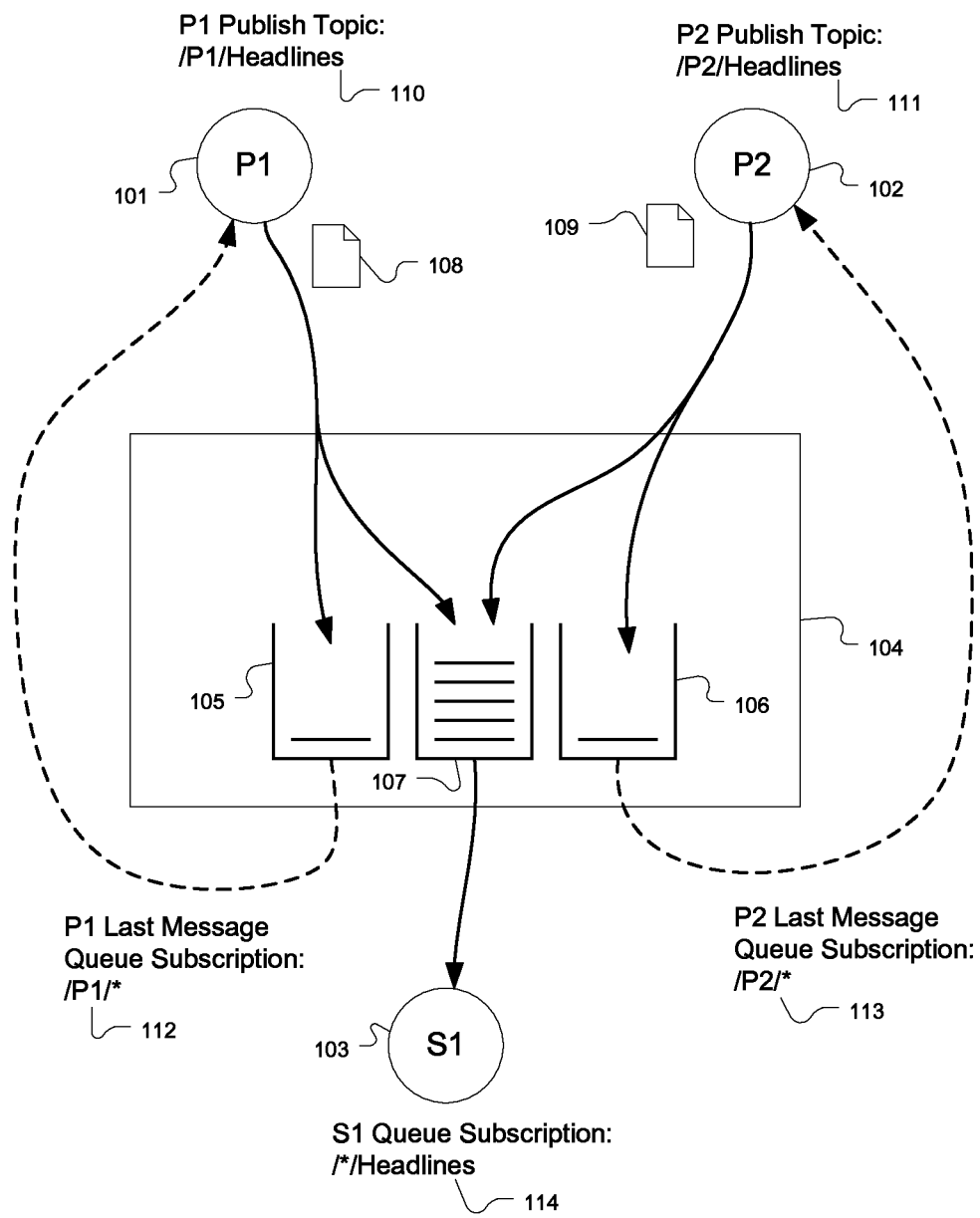
FIG. 1 shows an example message delivery system featuring publishing endpoints with associated last message queues using prior art methods.

There are many example message delivery systems known in the art; for example U.S. Pat. No. 7,716,525 herein included by reference describes a method of providing assured message delivery. FIG. 1 shows an example message delivery system 104 with three client endpoints 101-

103. The message delivery system 104 may be a network of devices, a single device or a software algorithm distributed among clients. The client endpoints 101-103 are typically software applications running on a general purpose computer or server but may be any device that is capable of communicating with the message delivery system 104.

The client endpoints 101-103 may produce messages, consume messages or produce and consume messages. In the example of FIG. 1 the messages 108-109 are transmitted from publishing client(s) 101-102 to subscribing client(s) 103 based on topics added to the messages 108-109 by the publishing clients 101-102; however it is possible within the scope of the invention to route messages 108-109 using other criteria such as the content of the message. The message delivery system 104 is responsible for delivering messages 108-109 received from publishing endpoints 101-102 and delivering them to subscribing endpoint(s) 103 that have indicated an interest in receiving messages that meet certain criteria. Note that while only a single subscribing client 103 is shown in FIG. 1 it is possible to have many subscribing clients connected to the message delivery system 104 and that it is possible for a single message to be delivered to many subscribing clients. Also of note is that client endpoints may be both publishers and subscribers simultaneously; as will be described, client endpoints 101-102 of the current example may in some cases also act subscribers. The message delivery system 104 uses subscriptions which are collected from or configured on behalf of subscribing endpoint(s) 103. The subscriptions are associated with queues 105-107 that exist within the message delivery system 104. When the message delivery system 104 receives a message 108-109 from a publishing client 101-102 it will inspect the topic and deliver a copy of the message 108-109 to each queue 105-107 with a matching subscription. Subscribing client(s) 103 receive messages by connecting to the queue(s) 107 associated with their subscriptions.

In the example system depicted in FIG. 1 the publishing clients 101-102 are assumed to be performing mission critical functions and must be resilient to system failures. In this example resilient means that the application can be restarted with no loss of information or there is a backup system that can resume operation (also with no loss of information) in the event of a failure. It is typical of many mission critical systems to store data in persistent storage such as a database or disk based file system before sending it to the message delivery system 104. If a publishing client 101-102 fails in the time between storing the message and receiving an acknowledgement back from the message delivery system 104 then when the client restarts (or the redundant takes over) it will not know for sure what was the last message received by the message delivery system 104. A common solution to this problem is to direct a copy of the messages 108-109 to a last message queue 105-106 that the publishing client 101-102 can read from when it restarts to determine the last message that the message delivery system 104 successfully received before the failure. In most message delivery systems it is possible for more than one publishing client 101-102 to publish messages 108-109 to the same topic endpoint. In the present example this would cause messages from publishing client P1 101 and publishing client P2 102 to be directed to the last message queues 105 and 106. Upon restarting after a failure a publishing client 101-102 would only be able to determine the last message sent to a particular topic end point, not the last message that that particular publisher had sent to the topic endpoint before failure. The solution to this problem known in the art today is to embed an identifier unique to the publishing client 101-102 into the topic of the message as shown in FIG. 1. The unique identifier embedded into the topic will allow the message delivery system 104 to separate messages sent from a particular publishing client 101-102 and direct them to a last message queue that is dedicated to that publishing client 101-102.

In the example system of FIG. 1, when the publisher P1 101 creates a message it is assigned the topic "/P1/Headlines" 110. P1's publisher last message queue 105 is configured to receive messages 108 sent to any topic that matches the "/P1/*" 112 subscription, where "*" indicates a wildcard matching any topic with any topic at that level of the hierarchy (hierarchical levels are delimited by the slash characters). By this mechanism any messages that are generated by publisher P1 101 will have a copy directed to the P1 publisher last message queue 105 by the message delivery system 104. Similarly publisher P2 102 will assign a topic starting with the prefix "/P2/" to any messages 109 that it generates and the P2 publisher last message queue 106 will be configured to receive any messages generated by publisher P2 102 by setting its subscription to "/P2/*" 113. The subscriber S1 103 is interested in receiving messages and in this case is not concerned by which publisher 101-102 generated the messages and so subscribes to messages matching subscription "/*/Headlines" 114. In the case of a failure of one of the publishers 101-102 a standby system (or the failed system itself after a restart) can connect to the publisher last message queue 105-106 to determine the last message 108-109 that the message delivery system 104 successfully received before the failure. Of note in this system is that subscriptions 112-113 are required per publisher 101-102 and the topic hierarchy has additional levels and associated complexity in order to accommodate the requirements for publisher resiliency. Also of note is that this solution is difficult to retro fit to an existing system since it requires changes to the topic structure; all clients 101-103 must at a minimum change their subscriptions in order to accommodate the new source hierarchy level, /P1/, /P2/etc.

Figure 2:
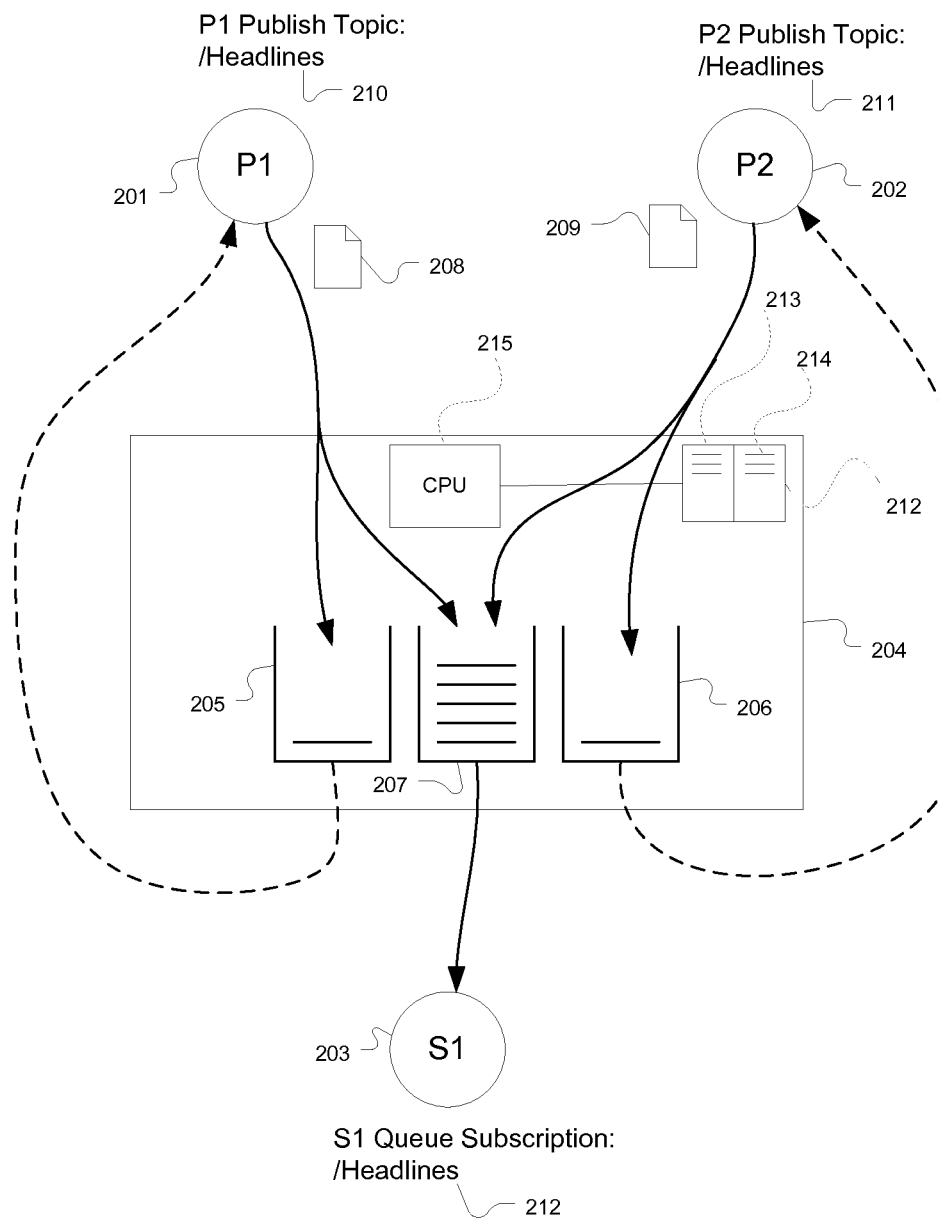
FIG. 2 shows an example message delivery system featuring publishing endpoints with associated last message queues using the methods of the present invention.

FIG. 2 shows a system similar to that of FIG. 1 but making use of the techniques of the present invention. It features publishing clients 201-202 similar to publishing clients 101-102 of FIG. 1, subscribing client(s) 203 similar to subscribing client(s) 103 of FIG. 1 and a message delivery system 204 similar to message delivery system 104 of FIG. 1. The publishing clients 201-202 generate messages 208-209 similar to messages 108-109 of FIG. 1 and add topics 210-211 similar to the topics 110-111 in the system of FIG. 1. The message delivery system 204 similar to the message delivery system 104 of FIG. 1 contains a series of message queues 205-207 similar to message queues 105-107 of FIG. 1.

The notable difference between the systems of FIG. 1 and FIG. 2 are in the topic structure and the topic bindings of the publisher last message queues 205-206. In the system of FIG. 2 the level of the topic hierarchy containing the source of the message is no longer needed; this is the/P1 or/P2 prefix added to the topics 110-111 in the system of FIG. 1. The interests 112-113 used to attract messages to the publisher last message queues 105-106 are also not required. Messages are directed to the publisher last message queues 205-206 based on an attribute of the publisher rather than the message topic.

The network operator can configure the message delivery system to create a last message queue for a publisher and by setting an attribute of the publisher can direct a copy of any message sent by the publisher to the last message queue. A network operator typically configures a message delivery system via command line interface (CLI) or a management application but could also be via modification of a configuration file. Alternately a publishing client could request that the message delivery system create for it an associated publisher last message queue via its client connection.

The message delivery system 204 further includes a look-up table 212 associating attributes 213 with publishers 214 and a processor 215 controlling the operation. The network operator can access the message delivery system 204 to establish a last message queue for any particular, or all, the publishers. The attribute in table 212 then indicates whether any particular publisher has a last message queue associated with it, and if so what is its identity.

When an incoming message arrives, the message delivery system 204 knows the identity of the publisher from the incoming connection established at login. Each publisher desirous of publishing messages goes through a login procedure to identify himself and set up a connection to the message delivery system 204. Upon the arrival of an incoming message the processor 215 then uses the known identity of the publisher to look up the relevant attribute 213 for the publisher associated with that message. The message can then be directed to the last message queue without the need to inspect the topic field or content of the packet. As a result retrofitting this system does not require the topic fields to be modified, which would have an effect on the entire message delivery network.

Those skilled in the art will see that the implementation of FIG. 2 requires no additional topic subscriptions and since the topic structure does not need to be modified one or all publishing clients 201-202 can be configured to make use of a publisher last message queue without affecting other clients 201-203. For example a publishing application could be modified to make it more resilient by employing a publisher last message queue without affecting any other client applications.

FIG. 1 and FIG. 2 depict topic routing systems but, those skilled in the art will see that the present invention is also applicable to message delivery systems that use the content of the message to determine which endpoints have an interest in receiving a copy of a particular message. Such systems are known in the art as content routing systems. In a prior art content routing system similar to the topic based system of FIG. 1 the publisher must add a unique identifier to the message content so that an interest that only attracts messages from a particular publisher can be attached to the publisher last message queue(s). In a content routing system making use of the techniques of the present invention, the publisher no longer needs to modify the content of the message in order to make use of a publisher last message queue.

Figure 3:
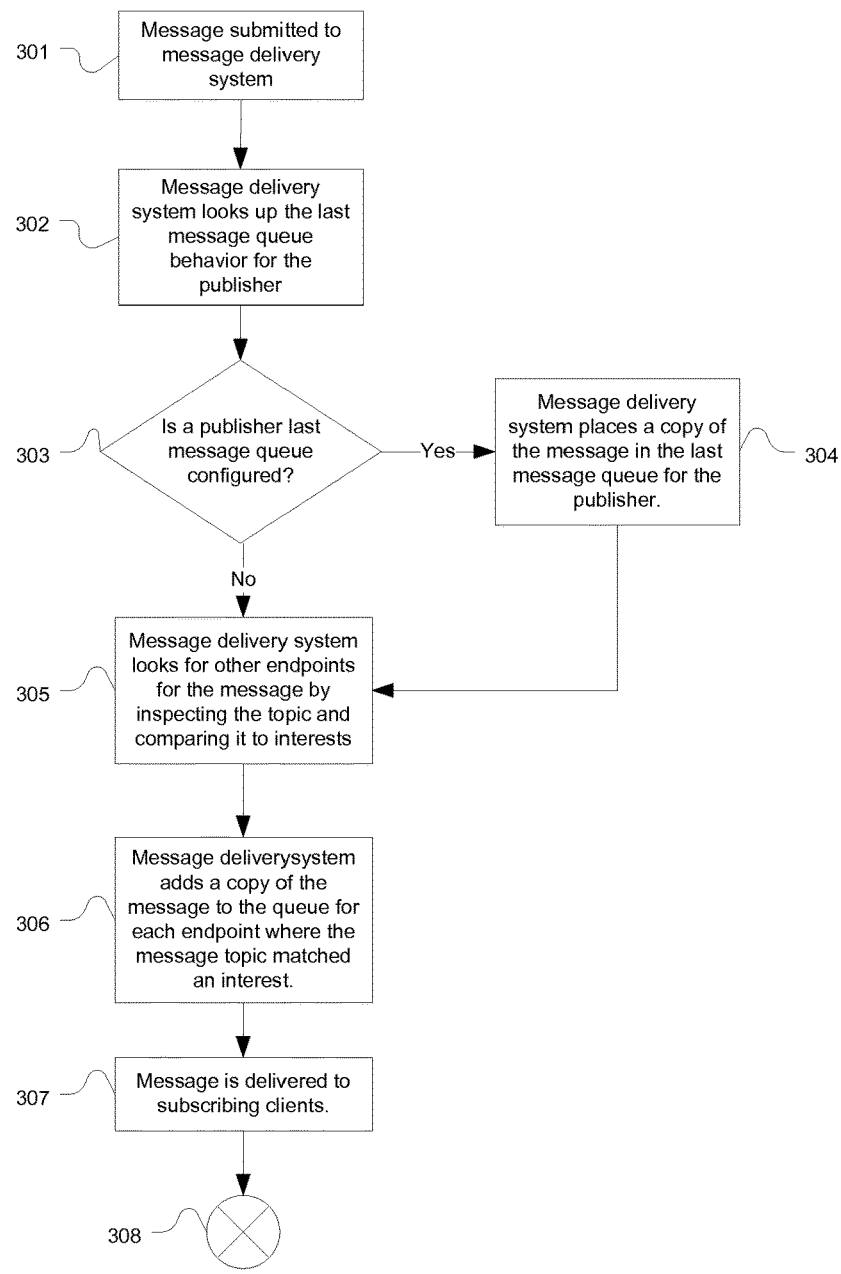
FIG. 3 shows a flow chart describing processing steps performed by the message delivery system in the present invention.

FIG. 3 is a flow chart that shows the processing steps involved in delivering a message from publisher to subscriber(s) and to a publisher last message queue using the methods of the present invention. In step 301 a publishing client creates a message and submits it to the message delivery system. As previously discussed the message will in most cases have an associated topic also generated by the publishing client that will be used to determine the endpoints that are interested in receiving a copy of the message; however the message delivery system may use any method which may or may not require a topic to determine the destination endpoints within the scope of the present invention. After receiving the message in step 302 the message delivery system checks the configuration it has for the publishing client to see if a publisher last message queue has been configured in step 303. The configuration may be set by a network administrator or at the request of the publishing client. If a publisher last message queue is configured for the publishing client that generated the message then proceed to step 304. In step 304 a copy of the message is placed in the publisher last message queue associated with the publishing client that generated the message. In most cases a last message queue has a depth of one message and it always holds the most recent message sent. However there may be cases where the publishing client wishes to be able to replay more than the last message and the queue depth maybe expanded. From step 304 the processing flow rejoins the standard processing flow at step 305. In step 305 the message delivery system performs the standard process of matching the message to the interests of subscribing clients; methods for which are well known in the art. For each match that was detected in step 305 a copy of the message is placed in queue for the associated subscribing client in step 306. The message is delivered to the subscribing client(s) in step 307; this may be by the message delivery system pushing a copy of the message to the subscribing client(s) or by the subscribing client(s) reading the message from a queue or a combination of methods based on the requirements of the individual subscribing client(s). If at some point a publishing client wishes to retrieve a copy of the last message it sent to the message delivery system it can connect to its last message queue and read a copy. Provided that a last message queue was previously configured in the message delivery system for the publishing client.

It will be appreciated by persons skilled in the art that many variants of the invention are possible.

All references mentioned above are herein incorporated by reference.

We claim:

1. A method of routing messages in a network, wherein messages are published by a plurality of publishers and are delivered to subscribers by a delivery system based on subscriptions relating to message content or topic fields contained within the messages, comprising:

creating a lookup table that includes a publisher identity and a last message queue attribute for each publisher of the plurality of publishers;

for each of the publishers, provisioning at an ingress router a respective last message queue being identified by the last message queue attribute associated therewith;

upon establishment of a connection with one of the publishers, determining from a login procedure the identity of the publisher with which the connection is established; and upon receipt of an incoming message originating from one of the publishers on said connection, determining the identity of the publisher originating the incoming message based on the identity of the publisher associated with said connection, and looking up the last message queue attribute of the publisher originating said Incoming message in said lookup table based on the determined identity of the publisher to identify the last message queue for that publisher; and storing the message in the last message queue identified by the attribute associated with the publisher originating the message, and matching one of a topic associated with the message and the content contained in the message with at least one subscription, and placing a copy of the particular message in a queue associated with said at least one subscription.

2. A method as claimed in claim 1, wherein each last message queue contains one message.

3. A method as claimed in claim 1, wherein the attribute for each publisher is configurable by a network operator to create the last message queue for that publisher.

4. A method as claimed in claim 1, wherein one last message queue is associated with a respective one of the publishers in response to a request from a publisher.

5. A method as claimed in claim 1, wherein the last message queue for each publisher is created by a network operator as a configurable feature of the network.

6. A method as claimed in claim 1, wherein the messages contain topics defined in hierarchical levels of the form /<topic1>/(topic2>/ . . . , without a non topic-based prefix, whereby no modification of a topic structure defined partly by the hierarchical levels is required to configure any last message queue.

* * * * *